United States Patent Office 3,686,211
Patented Aug. 22, 1972

3,686,211
INDOLYLALKANOIC ACID LACTONES
Daniel Frederick Dickel, Berkeley Heights, and George de Stevens, Summit, N.J., assignors to Ciba Corporation, Summit, N.J.
No Drawing. Continuation-in-part of application Ser. No. 642,310, May 31, 1967. This application Mar. 2, 1970, Ser. No. 15,953
Int. Cl. C07d 27/56
U.S. Cl. 260—326.14 R                6 Claims

ABSTRACT OF THE DISCLOSURE (1-aminoalkyl-3-indolyl)-alkanols or -alkanoic acids, e.g. those of the formula

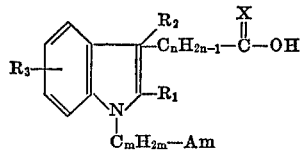

$R_1$=H or alkyl
$R_2$=H or OH
$R_3$=H, alkyl, alkoxy, alkylenedioxy, alkylmercapto, halogen, $CF_3$, $NO_2$ or amino
X=$H_2$ or O
m, n=2–7 and functional derivatives thereof, increase the contractile force of the heart.

CROSS-REFERENCES TO RELATED APPLICATIONS

This is a continuation-in-part of application Ser. No. 642,310, filed May 31, 1967 now U.S. Pat. No. 3,538,223.

SUMMARY OF THE INVENTION

The present invention concerns and has for its object the provision of new (1-aminoalkyl-3-indolyl)-alkanols or -alkanoic acids, more particularly of those corresponding to Formula I

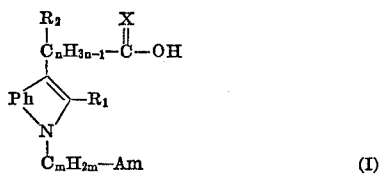

in which Ph is a 1,2-phenylene radical, each of m and n is an integer from 2 to 7, Am is an amino group, $R_1$ is hydrogen or lower alkyl, $R_2$ is hydrogen or hydroxy and X repersents two hydrogen atoms or oxo, of functional derivatives thereof as well as of corresponding pharmaceutical compositions and of methods for the preparation and application of these products. Said compositions are useful cardiovascular agents, for example, in the treatment of congestive heart failure or myocardial failure, e.g. such following infarction.

DESCRIPTION OF THE PREFERRED EMBODIMENTS

The 1,2-phenylene radical Ph is unsubstituted or substituted by one or more than one of the same or different substituents attached to any of positions available for substitution. Such substituents are, for example, lower alkyl, such as methyl, ethyl, n- or i-propyl or -butyl, free etherified or esterified hydroxy or mercapto, for example, lower alkoxy, alkylenedioxy or alkylmercapto, such as methoxy, ethoxy, n- or i-propoxy or -butoxy, methylenedioxy, 1,1- or 1,2-ethylenedioxy, methyl- or ethylmercapto, or halogen, such as fluoro, chloro or bromo, trifluoromethyl, nitro or amino, such as di-lower alkylamino, e.g. dimethylamino or diethylamino. The term "lower," referred to above and hereinafter in connection with organic radicals or compounds respectively, defines such with up to 7, preferably up to 4, carbon atoms.

Preferred radicals Ph are 1,2-phenylene,
(lower alkyl)-1,2-phenylene,
(lower alkoxy)-1,2-phenylene,
(lower alkylenedioxy)-1,2-phenylene,
(lower alkylmercapto)-1,2-phenylene,
(halogeno)-1,2-phenylene,
(trifluoromethyl)-1,2-phenylene,
(nitro)-1,2-phenylene or
(di-lower alkylamino)-1,2-phenylene.

A lower alkyl group $R_1$ preferably stands for methyl, but also for ethyl, n- or i-propyl, -butyl, -pentyl, -hexyl or -heptyl.

The lower alkylene group $C_mH_{2m}$ preferably stands for 1,2-ethylene, 1,2- or 1,3-propylene, but also for 2-methyl-1,3-propylene, 1,2- 1,3- 1,4- or 2,3-butylene, 2,3- 2,4- or 1,5-pentylene. 1,4-, 2,4- or 1,6-hexylene or 2,6-heptylene.

The radical

represents, for example, one of the above-mentioned alkylene groups, which can be substituted in any of the positions available for substitution, by a hydroxy group. Of these radicals those are preferred, that allow the formation of a 5- or 6-membered ether or lactone ring, such as the 3-hydroxy-1,4-butylene or -1,5-pentylene, 2-hydroxymethyl-1,3-propylene or especially the 2-(2-hydroxy-2-propyl)-1,3-propylene radical.

The amino group Am is a primary, secondary or preferably tertiary amino group, substituted, for example, by aliphatic, cycloaliphatic or araliphatic hydrocarbon radicals. Preferred amino groups Am are mono- or di-lower alkylamino, monocyclic lower alkyleneimino, monoaza-, -oxa- or -thiaalkyleneimino or N-(lower alkyl or hydroxylower alkyl)-monoazaalkyleneimino, wherein the heteroatoms are separated from each other or the indole nitrogen by at least 2 carbon atoms, such as mono- or dimethylamino, methylethylamino, mono- or diethylamino, di-n- or i-propylamino or di-n-butylamino; ethyleneimino, pyrrolindo, piperidino, 1,4-pentyleneimino, 2,5- or 16-hexyleneimino or 2,6 - heptyleneimino; piperazino, N - lower alkyl-piperazino, N-2-hydroxyethyl-piperazino, 3-aza-1,6-hexyleneimino, 3-lower alkyl-3-aza-1,6-hexyleneimino, 4-aza-1,7-heptyleneimino or 4-lower alkyl-4-aza-1,7-heptyleneimino; morpholino, 3,5-dimethyl-morpholino or thiamorpholino.

Functional derivatives of the compounds of Formula I are, for example, their esters, lactones or amides (in case X=O and $R_2$=OH), their cyclis ethers (in case X=$H_2$ and $R_2$=OH), their quaternaries and/or salts. Esters are preferably those derived from the acids of Formula I and lower alkanols, such as methanol, ethanol, n- or i-propanol, n-, i-, sec. or tert. butanol. The amides are either those derived from said acids and ammonia or amines, e.g. those of the formula H—Am, or amides derived from compounds in which Am is primary or secondary amino and lower alkanoic acids, such as acetic, propionic, butyric or pivalic acid. Quaternaries of the invention are preferably lower alkyl or aralkyl, such as HPh-lower alkyl quaternaries, e.g. methyl, ethyl, propyl, benzyl, 1- or 2-phenethyl quaternaries.

The compounds of the invention exhibit valuable pharmacological properties. Apart from coronary dilatating effects, they primarily cause an increase of the contractile force of the heart, as can be demonstrated in animal tests using, for example mammals, such as dogs, as test objects and applying the compounds of the invention at enteral doses between about 5 and 25 mg./kg./day. Besides their above-mentioned use, the compounds of the invention are also useful intermediates in the preparation of other valuable products, particularly of pharmacologically active compounds.

Particularly useful are compounds of Formula I, in which Ph is 1,2-phenylene, (lower alkyl)-1,2-phenylene, (lower alkoxy)-1,2-phenylene, (lower alkylenedioxy)-1,2-phenylene, (lower alkylmercapto) - 1,2 - phenylene, (halogeno)-1,2-phenylene, (trifluoromethyl)-1,2-phenylene, (nitro)-1,2-phenylene or (di-lower alkylamino)-1,2-phenylene, each of $m$ and $n$ is an integer from 2 to 7, Am is mono- or di-lower alkylamino, lower alkyleneimino, mono-aza-, oxa- or -thia-lower alkyleneimino or N-(lower alkyl or hydroxy-lower alkyl)-monoaza-lower alkyleneimino, wherein the heteroatoms are separated from each other or the indole nitrogen by at least 2 carbon atoms, $R_1$ is hydrogen or lower alkyl, $R_2$ is hydrogen or hydroxy and X represents two hydrogen atoms or oxo, lower alkyl esters, lactones, amides or dilower alkylamides of compounds wherein X is oxo, cyclic ethers of compounds in which X is hydrogen and $R_2$ is hydroxy, lower alkyl quaternaries or acid addition salts thereof.

Compounds that are especially valuable are those of Formula II

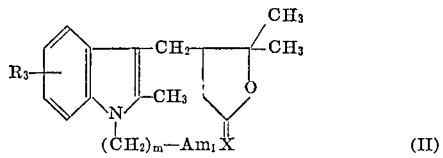

(II)

in which $m$ is an integer from 2 to 4, $Am_1$ is mono- or dialkylamino wherein alkyl contains up to 4 carbon atoms, pyrrolidino, piperidino, piperazino, N-(methyl, ethyl or 2-hydroxyethyl)- piperazino, morpholino or thiamorpholino, $R_3$ is hydrogen, alkyl or alkoxy with up to 4 carbon atoms, fluoro, chloro or trifluoromethyl and X represents two hydrogen atoms or oxo or therapeutically acceptable acid addition salts thereof.

Outstanding are compounds of Formula II, in which $m$ is the integer 2 or 3, $Am_1$ is mono- or dimethylamino, mono- or diethylamino, pyrrolidino, piperidino, piperazino or morpholino, $R_3$ is hydrogen, methyl, methoxy, fluoro or chloro, and X represents two hydrogen atoms or oxo, or therapeutically useful acid addition salts thereof which, when given to anesthetized dogs at oral doses between about 5 and 25 mg./kg./day, show a high and long-lasting increase of the contractile force of the heart, similar to the effect produced by digitoxin.

The compounds of the invention are prepared according to methods in themselves known, preferably by reacting a reactive ester of the alcohol $X-C_mH_{2m}-OH$ with the amine Y—H, in which one of X and Y stands for Am and the other for the radical

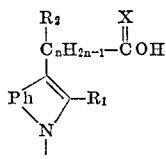

or a functional derivative thereof, and, if desired, converting any resulting compound into another compound of the invention.

A reactive ester of the alcohols mentioned above is, for example, such derived from a mineral acid, e.g. hydrochloric, hydrobromic, hydroiodic or sulfuric acid, or a sulfonic acid, such as an alkane- or benzenesulfonic acid, e.g. methane-, ethane- or p-toluenesulfonic acid.

The compounds of the invention so obtained can be converted into each other by methods in themselves known. Thus, for example, primary, secondary or tertiary amines can be converted into tertiary amines or quaternaries respectively, for example, with the use of reactive esters of corresponding alcohols, preferably lower alkanols or aralkanols, or by reductive alkylation. Resulting primary or secondary amines or alcohols can be acylated or esterified respectively, for example with the use of reactive acid derivatives, preferably lower alkanoyl halides or anhydrides. Resulting esters, lactones or amides can be subjected to hydrolysis, ammonolysis, hydrazinolysis, acidolysis, transesterification or reduction. The latter is advantageously carried out with the use of esters or lactones and complex light metal hydrides, preferably alkali metal aluminum hydrides, e.g. lithium alumium hydride, to yield the corresponding alkanols or glycols of Formula I, wherein X represents two hydrogen atoms. Any resulting glycol ($X=H_2$ and $R_2=OH$) can be dehydrated to form the cyclic ether, for example with the use of strong mineral or sulfonic acids, e.g. those described above, or reactive derivatives thereof, such as the halides thereof.

The above-mentioned reactions are carried out according to standard methods, in the presence or absence of diluents, preferably such as are inert to the reagents and are solvent thereof, of catalysts, condensing agents and/or inert atmospheres, at low temperatures, room temperature or elevated temperatures, at atmospheric or superatmospheric pressure. Reactive esters of $X-C_mH_{2m}-OH$ are advantageously reacted with an excess of the corresponding amines or in the presence of other bases, preferably alkali metal carbonates or bicarbonates or tertiary nitrogen bases, such as trialkylamines, N,N-dialkylanilines or pyridines.

The compounds of the invention are obtained in the free form or in the form of their salts, depending on the conditions under which the process is carried out; the salts are also included in the present invention. Salts that are obtained can be converted into the free compounds in known manner, depending on their acidic or basic character, for example with the use of acids, alkalies or ion exchangers. Free acids that are obtained can be converted into their metal or ammonium salts, preferably with the use of alkali or alkaline earth metal hydroxides, carbonates or bicarbonates, ammonia or amines. Free bases that are obtained can be converted into salts by reaction with inorganic or organic acids, especially those that are suitable for the formation of therapeutically useful salts. Such acids are, for example, mineral acids, such as hydrohalic, e.g. hydrochloric or hydrobromic acid, sulfuric, phosphoric, nitric or perchloric acid, aliphatic, alicyclic, araliphatic, aromatic or heterocyclic carboxylic or sulfonic acids, such as, formic, acetic, propionic, succinic, glycollic, tactic, malic, tartaric, citric, asorbic, maleic, hydroxymaleic, pyroracemic, phenylacetic, benzoic, aminobenzoic, anthranilic, hydroxybenzoic, salicyclic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, secondary amines may be used in the form of their alkali metal salts or basic reactants in the form of their acid addition salts. Mainly, those starting materials should be used in the reactions of the invention that lead to the formation of those compounds indicated above as being specially valuable.

The starting material used is known or, if new, may be prepared according to known methods. Thus, for example, the amine in which YH is the 1-unsubstituted indole compound, can be obtained according to Fischer's indole synthesis, i.e. by heating phenylhydrazones of the formula

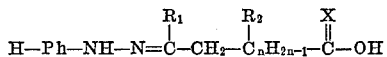

or functional derivatives thereof, in the presence of Lewis acids, such as heavy metal chlorides, e.g. zinc chloride, or strong acids, e.g. sulfuric acid.

Starting material or final products that are mixtures of isomers may be separated into single isomers by methods in themselves known. For example, compounds that contain one or more asymmetrical carbon atoms may be in the form of racemate mixtures, pure racemates or optical antipodes. Mixtures of racemates, by virtue of the physico-chemical differences between the components, can be resolved into pure racemates, for example, by chromatography and/or fractional crystallization. Racemic products can likewise be resolved into the optical antipodes, for example, by reaction with optically active acids, separation of the diastereomeric salts and liberation of the bases from the salts.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

EXAMPLE 1

The solution of 140 g. β-(2-methyl-3-indolylmethyl)-γ-dimethylbutyric acid lactone in 525 ml. dimethylformamide is added to the cooled mixture of 13.2 g. sodium hydride (as a 54% suspension in mineral oil) and 525 ml. dimethylformamide, while stirring under nitrogen. The mixture is then stirred at room temperature for 3 hours, during which time additional 19.66 g. sodium hydride in mineral oil are added. After cooling 117.6 g. 2-dimethylaminoethyl chloride hydrochloride are added in small portions while stirring, whereupon the mixture is allowed to stand at room temperature for 3 days. After the addition of 2.7 liters diethyl ether, the mixture is stirred for 3 hours and filtered. The residue is washed with water, the organic solution separated, dried and acidified with 5 N ethanolic hydrochloric acid. The precipitate formed is separated and recrystallized from methanol, to yield the β-[N-(2-dimethylaminoethyl) - 2 - methyl-3-indolylmethyl]-γ-dimethylbutyric acid lactone hydrochloride of the formula

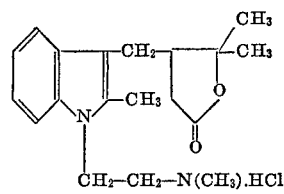

melting at 121–122°.

The starting material is prepared as follows: The solution of 55 g. phenylhydrazine hydrochloride in 1 liter water is added to the mixture of 69 g. of β-(3-oxobutyl)-γ-dimethylbutyric acid lactone, 60 g. potassium acetate and 650 ml. water while stirring under nitrogen. Stirring is continued for 2 hours at room temperature, whereupon 450 ml. concentrated sulfuric acid are added dropwise without cooling. The mixture is heated to about 80–90°, stirred for 2 hours and allowed to stand overnight at room temperature. The precipitate formed is filtered off, washed with water until the filtrate is neutral, recrystallized from methanol, chromatographed on alumina and eluted with benzene-methylene chloride, to yield the β-(2-methyl-3-indolylmethyl)-γ-dimethylbutyric acid lactone, melting at 141.5–142.5°.

In the analogous manner the following starting materials are prepared from equivalent amounts of the corresponding phenylhydrazine:

(a) β - (2,5-dimethyl-3-indolylmethyl)-γ-dimethylbutyric acid lactone, M.P. 173–175°,
(b) β-(2-methyl-5-fluoro-3-indolylmethyl)-γ-dimethylbutyric acid lactone, M.P. 168–170°,
(c) β-(2-methyl-5-chloro-3-indolylmethyl)-γ-dimethylbutyric acid lactone, M.P. 183–185°,
(d) β-(2-methyl-5-methoxy-3-indolylmethyl)-γ-dimethylbutyric acid lactone, M.P. 157–159° and
(e) β-(2-methyl-6-methoxy-3-indolylmethyl)-γ-dimethylbutyric acid lactone, M.P. 150–152°.

EXAMPLE 2

In the manner described in the previous example, the following hydrochlorides of the compounds having Formula II, are prepared from equivalent amounts of the corresponding starting material; all resulting compounds are recrystallized from methanol:

| Am₁ | m | R³ | X | M.P., degrees |
|---|---|---|---|---|
| N(CH₃)₂ | 3 | H | O | 159–160 |
| N(i-C₃H₇)₂ | 2 | H | O | 124–126 |
| Pyrrolidino | 2 | H | O | 208–210 |
| Piperidino | 2 | H | O | 247–248 |
| Morpholino | 2 | H | O | 210–212 |

Using the starting materials described in Example 1 under items (a), (b) and (c) the corresponding compounds of Formula II, in which R₂ stands for methyl, fluoro or chloro, are obtained.

EXAMPLE 3

The solution of 16 g. β-(2-methyl-3-indolylmethyl)-γ-dimethylbutyric acid lactone in 60 ml. dimethylformamide is added to the mixture of 2.8 g. 53.5% sodium hydride in mineral oil and 100 ml. dimethylformamide, while cooling in an ice bath and stirring under nitrogen. After stirring for 2 hours at room temperature, 4.2 g. sodium hydride in mineral oil are added while cooling, followed by 172.1 g. 2-diethylaminoethyl chloride hydrochloride, which is added portionwise. The mixture is stirred at room temperature for 4 days, diluted with 500 ml. diethylether, filtered, the filtrate washed with water, dried and combined with 25 ml. 5 N ethanolic hydrochloric acid. The precipitate formed is separated and recrystallized from methanol-ethyl acetate, to yield the β-[N - (2 - diethylaminoethyl)-2-methyl-3-indolylmethyl]-γ-dimethylbutyric acid lactone hydrochloride of the formula

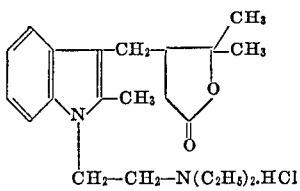

melting at 154–156°.

EXAMPLE 4

10.5 g. 53.5% sodium hydride in mineral oil are washed with dimenthylformamide and suspended in 110 ml. thereof. To the suspension, the solution of 15 g. β-(2-methyl-3-indolylmethyl)-γ-dimethylbutyric acid lactone in 100 ml. dimethylformamide is added dropwise while cooling in an ice bath and stirring under nitrogen. Hereupon 19.4 g. 1-(2-chloroethyl-piperazine dihydrochloride are added portionwise and the mixture stirred at room temperature for 2 days. It is diluted with diethyl ether, filtered, the filtrate washed with water, dried, filtered and evaporated. The residue is taken up in the minimum amount of ethanol, the solution acidified with ethanolic hydrochloric acid and the precipitate formed recrystallized from ethanol-methylene chloride, to yield the β-[N-(2 - piperazinoethyl) - 2 - methyl-3-indolylmethyl]-γ-dimethylbutyric acid lactone dihydrochloride of the formula

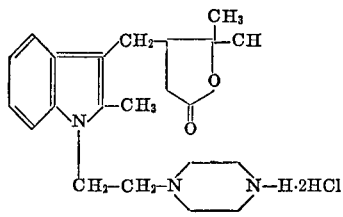

showing in the U.V. spectrum maxima at 226 mμ (ϵ=668.6) and 284 mμ (ϵ=153.7).

EXAMPLE 5

The solution of 20.3 g. methyl γ-(3-indolyl)-butyrate in 240 ml. dimethylformamide is slowly added to the mixture of 9 g. 53.5% sodium hydride in mineral oil and 150 ml. dimethylformamide while cooling and stirring under nitrogen. After 3 hours another 13.47 g. 53.5% sodium hydride are added, followed by small portions of 51.5 g. 2-diethylaminoethyl chloride hydrochloride and the whole is stirred for 2 days. The mixture is diluted with 500 ml. diethyl ether, washed with water, dried, filtered and evaporated. The residue is taken up in the minimum amount of diethyl ether, the solution acidified with ethereal hydrogen chloride, the precipitate formed filtered off and recrystallized from methanol, to yield the methyl γ - [N-(2-diethylaminoethyl)-3-indolyl]-butyrate hydrochloride of the formula

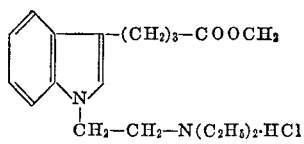

melting at 120–122°.

EXAMPLE 6

To the mixture of 22.2 g. β-[N-(2-dimethylaminoethyl)-2-methyl-3-indolylmethyl]-γ-dimethylbutyric acid lactone hydrochloride and 400 ml. diethyl ether, 4.9 g. sodium hydroxide in 150 ml. water are added while stirring and cooling with ice. The aqueous solution is separated, washed with diethyl ether, the combined organic solutions dried, filtered and slowly dropped to the suspension of 8.1 g. lithium aluminum hydride in 300 ml. diethyl ether while cooling with ice and stirring under nitrogen. The mixture is stirred overnight at room temperature, refluxed for 1½ hours, cooled with ice and 30 ml. water are added. It is filtered, the filtrate evaporated in vacuo, the residue taken up in the minimum amount of ethanol and the solution acidified with ethanolic hydrogen chloride. The precipitate formed is filtered off, dried and recrystallized from methanol-ethyl acetate, to yield the 4-[N-(2-dimethylaminoethyl)-2-methyl-3-indolyl]-3-(2-hydroxy-2-propyl)-butanol hydrochloride of the formula

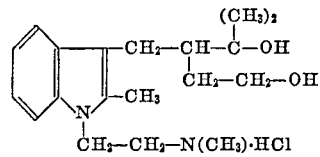

melting at 156–160° with decomposition.

8.17 g. thereof are dissolved in 25 ml. water, the solution made basic with 10% aqueous sodium hydroxide and extracted with methylene chloride. The extract is washed with water, dried, filtered and evaporated, to yield the corresponding free base.

EXAMPLE 7

To the solution of 7.6 g. 4-[N-(dimethylaminoethyl)-2-methyl-3-indolyl]-3-(2-hydroxy-2-propyl) - butanol in 10 ml. pyridine, 9.9 g. p-toluenesulfonyl chloride in 10 ml. pyridine are added dropwise while stirring and the mixture allowed to stand at room temperature overnight. It is poured onto ice, extracted with methylene chloride, the extract dried, filtered and evaporated. The residue is taken up in the minimum amount of methanol, the solution acidified with methanolic hydrogen chloride, diluted with diethyl ether, the precipitate formed filtered off and recrystallized from methanolethyl acetate, to yield the 2-dimethyl-3-[N-(2-dimethylaminoethyl)-2-methyl - 3 - indolylmethyl]-tetrahydrofuran hydrochloride of the formula

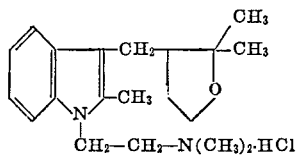

melting first at 165–168° and again at 215–218°.

EXAMPLE 8

The solution of 15 g. β-(2-methyl-3-indolylmethyl)-γ-dimethylbutyric acid lactone in 75 ml. dimethylformamide is added to the mixture of 2.8 g. 53.5% sodium hydride in mineral oil and 75 ml. dimethylformamide while cooling and stirring under nitrogen. After two hours another 4 g. of said sodium hydride are added followed by the addition of 11.39 g. 2-methylaminoethylchloride hydrochloride, while stirring for two hours. The mixture is stirred at room temperature for three days, diluted with 400 ml. diethyl ether, filtered, the filtrate washed with water, dried and evaporated. The residue is taken up in the minimum amount of diethyl ether the solution acidified with methanolic hydrochloric acid, and the precipitate formed recrystallized from ethanol, to yield the β-[N-(2-methylaminoethyl)-2-methyl-3 - indolylmethyl] - γ - dimethylbutyric acid lactone hydrochloride of the formula

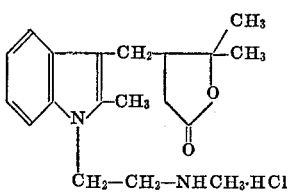

melting at 224–226° with decomposition.

EXAMPLE 9

In the manner description in the previous examples the following compounds are prepared from equivalent amounts of the corresponding starting materials described in Example 1.

(c) β-[N(2-diethylaminoethyl)-2-methyl-5 - chloro - 3-indolylmethyl]-γ-dimethylbutyric acid lactone hydrochloride, M.P. 146–149° (methanol-diethylether);

(d) β-[N-(2-dimethylaminoethyl)-2-methyl-5-methoxy-3-indolylmethyl]-γ-dimethylbutyric acid lactone, M.P. 111–113° (ethanol); and (e) β-[N-(dimethylaminoethyl)-2-methyl-6-methoxy - 3-indolylmethyl]-γ-dimethylbutyric acid lactone hydrochloride M.P. 190–193° (ethanol).

The base mentioned under Item (d) can be reduced as described in Example 6, to yield the 4-[N-(2-diethylaminoethyl)-2-methyl-5-methoxy-3-indolyl]-3-(2 - hydroxy - 2-propyl)-butanol melting at 89–91° (benzene), which can be dehydrated as described in Example 7, to yield the 2-dimethyl-3-[N-(2-diethylaminoethyl)-2-methyl-5 - methoxy-3-indolylmethyl]tetrahydrofuran melting at 75–76°.

EXAMPLE 10

Preparation of 10,000 tablets each containing 50.0 mg. of the active ingredient:

Formula: G.
β - [N - (2-diethylaminoethyl)-2-methyl-3-indolylmethyl] - γ - dimethylbutyric acid lactone hydrochloride _____ 500.00
Lactose _____ 1,706.00
Corn starch _____ 90.00
Polyethylene glycol 6,000 _____ 90.00
Talcum powder _____ 90.00
Magnesium stearate _____ 24.00
Purified water q.s.

Procedure

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 openings and compressed into tablets using concave punches with 7.1 diameter, uppers bisected.

EXAMPLE 11

Preparation of 10,000 tablets each containing 25.0 mg. of the active ingredient:

Formula: G.
2-dimethyl-3-[N-(2 - dimethylaminoethyl)-2-methyl - 3 - indolylmethyl]-tetrahydrofuran hydrochloride _____ 250.00
Lactose _____ 1,956.00
Corn starch _____ 90.00
Polyethylene glycol 6,000 _____ 90.00
Talcum powder _____ 90.00
Magnesium stearate _____ 24.00
Purified water q.s.

Procedure

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 openings and compressed into tablets using concave punches with 7.1 diameter, uppers bisected.

We claim:

1. A compound of the formula

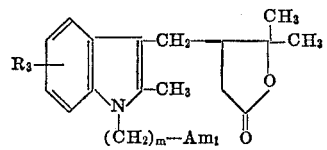

in which $m$ is an integer from 2 to 4, $Am_1$ is mono- or dialkylamino, pyrrolidino, piperidino, piperazino, N-(methyl, ethyl or 2-hydroxyethyl)-piperazino, or morpholino, $R_3$ is hydrogen, methyl, methoxy, fluoro, chloro or trifluoromethyl, wherein alkyl contains up to 4 carbon atoms or a therapeutically useful acid addition salt thereof.

2. A compound as claimed in claim 1, in which formula $m$ is the integer 2 or 3, $Am_1$ is mono- or dimethylamino, mono- or diethylamino, pyrrolidino, piperidino, piperazino or morpholino and $R_3$ is hydrogen, methyl, methoxy, fluoro or chloro or a therapeutically useful acid addition salt thereof.

3. A compound as claimed in claim 1, and being the β-[N-(2 - dimethylaminoethyl)-2-methyl-3-indoylmethyl]-γ-dimethylbutyric acid lactone or a therapeutically useful ful acid addition salt thereof.

4. A compound as claimed in claim 1, and being the β-[N-(3-dimethylamino-propyl) - 2 - methyl - 3 - indolylmethyl]-γ-dimethylbutyric acid lactone or a therapeutically useful acid addition salt thereof.

5. A compound as claimed in claim 1, and being the β-[N-(2 - diethylaminoethyl)-2-methyl-3-indolylmethyl]-γ-dimethylbutyric acid lactone or a therapeutically useful acid addition salt thereof.

6. A compound as claimed in claim 1, and being the β[N-(2 - pyrrolidinoethyl)-2-methyl-3-indolylmethyl]-γ-dimethylbutyric acid lactone or a therapeutically useful acid addition salt thereof.

References Cited
UNITED STATES PATENTS
3,509,174   4/1970   Lin _____ 260—326.14

ALEX MAZEL, Primary Examiner

J. A. NARCAVAGE, Assistant Examiner

U.S. Cl. X.R.

260—243 B, 247.2 B, 247.5 B, 268 BC, 293.61, 326.15; 424—246, 248, 250, 267, 274

UNITED STATES PATENT OFFICE
CERTIFICATE OF CORRECTION

Patent No. 3,686,211  Dated August 22, 1972

Inventor(s) DANIEL FREDERICK DICKEL ET AL

It is certified that error appears in the above-identified patent and that said Letters Patent are hereby corrected as shown below:

Column 1, line 4-5, after "assignors to" delete "Ciba Corporation, Summit, N. J." and substitute --- CIBA-GEIGY Corporation, Ardsley, N. Y. ---

Signed and sealed this 23rd day of July 1974.

(SEAL)
Attest:

McCOY M. GIBSON, JR.
Attesting Officer

C. MARSHALL DANN
Commissioner of Patents